US012373891B2

(12) United States Patent
Agrawal et al.

(10) Patent No.: US 12,373,891 B2
(45) Date of Patent: *Jul. 29, 2025

(54) MODEL-BASED CONFIGURATION OF FINANCIAL PRODUCT OFFERINGS

(71) Applicant: Teachers Insurance and Annuity Association of America, New York, NY (US)

(72) Inventors: Pankaj Agrawal, Concord, NC (US); Alexis S. Pecoraro, Huntersville, NC (US); James G. Rauscher, Erie, CO (US); John V. Hintze, Charlotte, NC (US); Daniel R. Hursh, Dayton, OH (US); Gregory B. Bahns, West Chester, OH (US); Edward J. Miller, Jr., Iola, KS (US)

(73) Assignee: Teachers Insurance and Annuity Association of America, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,667

(22) Filed: Oct. 5, 2023

(65) Prior Publication Data

US 2024/0037663 A1 Feb. 1, 2024

Related U.S. Application Data

(63) Continuation of application No. 16/664,101, filed on Oct. 25, 2019, now Pat. No. 11,830,074.

(51) Int. Cl.
*G06Q 40/06* (2012.01)
*G06Q 40/02* (2023.01)
*G06F 3/04847* (2022.01)

(52) U.S. Cl.
CPC ............ *G06Q 40/06* (2013.01); *G06Q 40/02* (2013.01); *G06F 3/04847* (2013.01)

(58) Field of Classification Search
CPC ....... G06Q 40/02; G06Q 40/06; G06Q 10/103
See application file for complete search history.

(56) References Cited

U.S. PATENT DOCUMENTS 8,935,277 B2 * 1/2015 Kuchmann-Beauger ................... G06F 16/9024 707/769
2013/0304724 A1 11/2013 Rosjat
(Continued)

OTHER PUBLICATIONS

Neo4j, "The Neo4j Getting Started Guide v4.0", https://go.neo4j.com/Neo4j-PDF-Documentation-DL.html?doc=neo4jgetting-started-4.0 .pdf&_ga=2.244073861.1862969043.1579712607-736095361. 1579712607, 27 pages, retrieved rom the internet on Jan. 22, 2020.

*Primary Examiner* — Hao Fu
(74) *Attorney, Agent, or Firm* — Lowenstein Sandler LLP

(57) ABSTRACT

Disclosed are methods and systems for automatically configuring financial product offerings. An example method includes: receiving, by a computer system, a graph model representing a plurality of permutations of definition provisions of a financial product; translating at least a subset of the graph model into definitions of a plurality of business objects; translating the definitions of the plurality of business objects into definitions of a plurality of services to be implemented by an offering of the financial product; receiving, via a user interface, a plurality of service configuration options; applying the plurality of service configuration options to the definitions of the plurality of services; and generating, based on the definitions of the plurality of services, service configuration data for the offering of the financial product.

20 Claims, 11 Drawing Sheets

(56) References Cited

U.S. PATENT DOCUMENTS

| | | | |
|---|---|---|---|
| 2014/0279332 A1* | 9/2014 | Poole | G06Q 20/3224 |
| | | | 705/35 |
| 2015/0160988 A1 | 6/2015 | Scomparim | |
| 2016/0328792 A1 | 11/2016 | Blandford | |
| 2019/0294985 A1 | 9/2019 | Baughman | |
| 2020/0134732 A1* | 4/2020 | Hoang | G06Q 40/08 |

* cited by examiner

```
{
    nodeId: "3e0e4046-288c-42d8-29a1-79daadb74e70",
    name: "Eligibility Rules",
    description: "Control type representing the multiple instances of eligibility rules that can be created for a plan
    which repeats for EE Group, Sources, Part Date, Age Req and Service Req options.",
    min: "1",
    max: "n",
    dataType: "array",
    canonicalName: "Eligibility Rules",
    - groupOfGroups: [
        - {
            nodeId: "9835c1ad-aa5a-403d-9d4b-0ef60fe378a6",
            name: "Eligibility Rule",
            description: "Specific instance of an eligibility rule set established for a plan.",
            min: null,
            max: null,
            dataType: "object",
            canonicalName: "Eligibility Rule",
            - mayHaveDataTypes: [
                - {
                    nodeId: "9d0361ae-e91f-4f24-695e-18ae56477e7e",
                    name: "Service Units",
                    description: "Max and Min # of Service Units",
                    dataType: "integer",
                    option: ">=, <=",
                    displayDefaultValue: null,
                    recommended: false,
                    min: "1",
                    max: "99",
                    canonicalName: "Service Units",
                    richText: null,
                    regexName: null,
                    regexName: null,
                    + mustHaveGroups: [...]
                },
                + {...},
                + {...}
            + mustHaveDataTypes: [...],
            + mayHaveGroups: [...],
            + mustHaveGroups: [...]
        }
    ]
}
```

MODEL-BASED CONFIGURATION OF FINANCIAL PRODUCT OFFERINGS

REFERENCE TO RELATED APPLICATIONS

This application is a continuation of U.S. patent application Ser. No. 16/664,101 filed on Oct. 25, 2019, which is incorporated by reference herein.

TECHNICAL FIELD

The present disclosure is generally related to distributed computer systems, and is more specifically related to methods and systems for model-based configuration of financial product offerings.

BACKGROUND

A financial institution may offer a variety of products to individual and/or institutional clients. Examples of financial institutions include, but are not limited to, banks, building societies, credit unions, trust companies, mortgage loan companies, insurance companies, investment banks, underwriters, brokerage firms, etc. Examples of financial products include retirement accounts, annuity contracts, individual retirement accounts, target date funds, etc.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3B schematically illustrates a programmatic representation of the example offering mesh fragment of FIG. 3A.

FIG. 7 schematically illustrates an example screen rendered by the user interface layer, in accordance with one or more aspects of the present disclosure.

DETAILED DESCRIPTION

Figure 1:
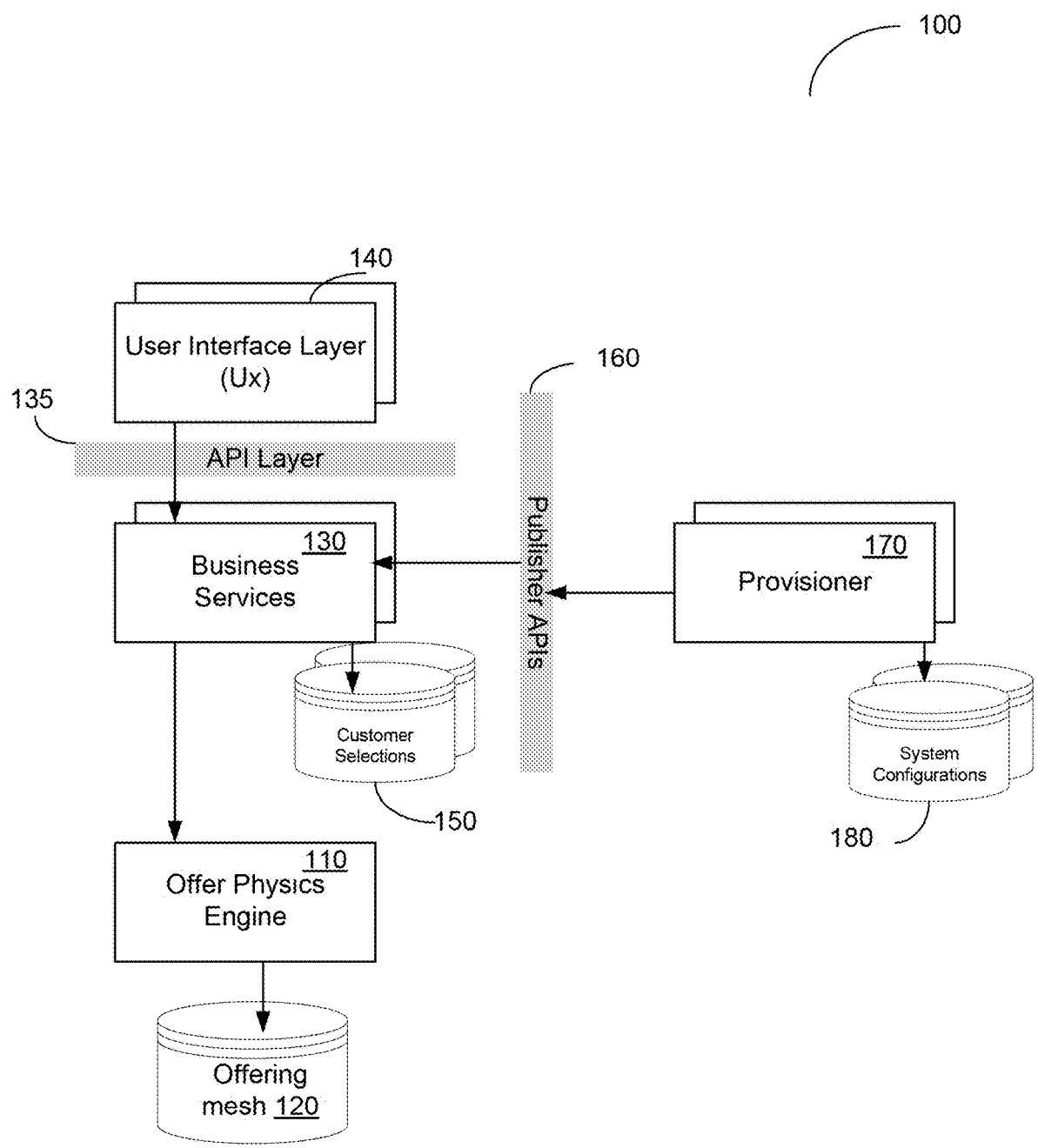
FIG. 1 schematically illustrates a high-level component diagram of an example service configuration system implemented in accordance with one or more aspects of the present disclosure.

Described herein are methods and systems for model-based configuration of financial product offerings.

A financial product offering (e.g., a retirement account, an annuity contract, an individual retirement account, or a target date fund, etc.) may include multiple services (e.g., eligibility service, enrollment service, contribution calculation service, disbursement service, etc.) that should be configured in accordance with the financial product definition provisions, pertinent regulations, administrative practices, and/or various other rules and specifications. The resulting configuration would define all service configuration options, preferences, and parameters, inter-dependencies, and interfaces of the services employed by the financial product offering.

In various common implementations, the configuration tasks are mostly performed by financial institution personnel and involve perusing the product requirement and definition documents, templates, third-party documents, etc., in order to produce a set of weakly-structured documents (e.g., flat files or spreadsheets) specifying the requisite service configuration options, preferences, and parameters. Apart from being labor intensive, such processes are error prone, often resulting in suboptimal or even defective service configurations.

Systems and methods of the present disclosure address the above-noted deficiencies of various common implementations by employing an automated service configuration process that utilizes a graph model representing a multitude of possible permutations of financial product definition provisions, collects the pertinent information related to the customer requirements and business practices, applies the collected information to at least a subset of the graph model in order to identify the service configuration, and generates service configuration data in the form that is consumable by the downstream systems (e.g., service provisioning agents).

In an illustrative example, a multitude of possible permutations of financial product definition provisions may be represented by a graph model, also referred to as "offering mesh" herein. The nodes of the offering mesh may represent various data points related to one or more services employed by a financial product, while the edges may represent relationships among the data points.

A computer system implementing the methods and systems for model-based configuration of financial product offerings may interpret the offering mesh and translate the extracted financial product definition provisions to a structured object format consumable by the business services, which may translate the objects to service definitions implementing the necessary business and/or auxiliary functions. In the process of translating the offering mesh objects into the service definitions, the business services may identify the necessary customer selections and other pertinent information items that need to be provided by the user interface input. The customer selections and information received via the user interface may be translated into service configuration options, preferences, and parameters.

One or more provisioners accessing the business services via a publisher application API may generate system configurations consumable by the downstream systems (e.g., provisioning agents). The provisioning agents may utilize the system configurations for provisioning the computer systems, services, software, and/or auxiliary components that are needed for implementing the financial product offering, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates a high-level component diagram of an example service configuration system implemented in accordance with one or more aspects of the present disclosure. As shown in FIG. 1, the service configuration system 100 includes the offer physics engine 110 in communication with the data store that is employed for storing the offering mesh 120. The offering mesh 120 may be implemented by a graph model representing a multitude of possible permutations of financial product definition provisions, as described in more detail herein below with references to FIG. 2.

The offer physics engine 110 may interpret one or more fragments of the offering mesh 120 and translates the extracted financial product definition provisions to one or more business objects consumable by the business services 130.

The business services 130 may translate the objects to definitions of Service-Oriented Architecture (SOA) services implementing the necessary business and/or auxiliary functions. In the process of translating the offering mesh objects into the service definitions, the business services 130 may identify the necessary customer selections and other pertinent information items that need to be provided by the user interface input.

The user interface layer (Ux) 140 may receive, via the application programming interface (API) layer 135, the service and object definitions that are exposed by the business services 130 and translates the received service and object definitions into human-perceivable representations, which may be rendered via one or more graphical user interfaces (GUIs). In particular, the user interface layer 140 may be employed for receiving customer selections and gathering other information that is relevant for the service and object definitions. The information received via the user interface layer 140 may be translated into service configuration options, preferences, and parameters that are stored in the customer selections database 150.

The publisher API 160 provides an interface between the business services 130 and the provisioner 170, which generates system configurations. The generated system configurations may be saved in the system configuration database 180 and/or consumed by downstream systems (e.g., provisioning agents). The provisioning agents (not shown in FIG. 1) may utilize the system configurations for provisioning the computer systems, services, software, and/or auxiliary components that are needed for implementing the financial product offering.

Figure 2:
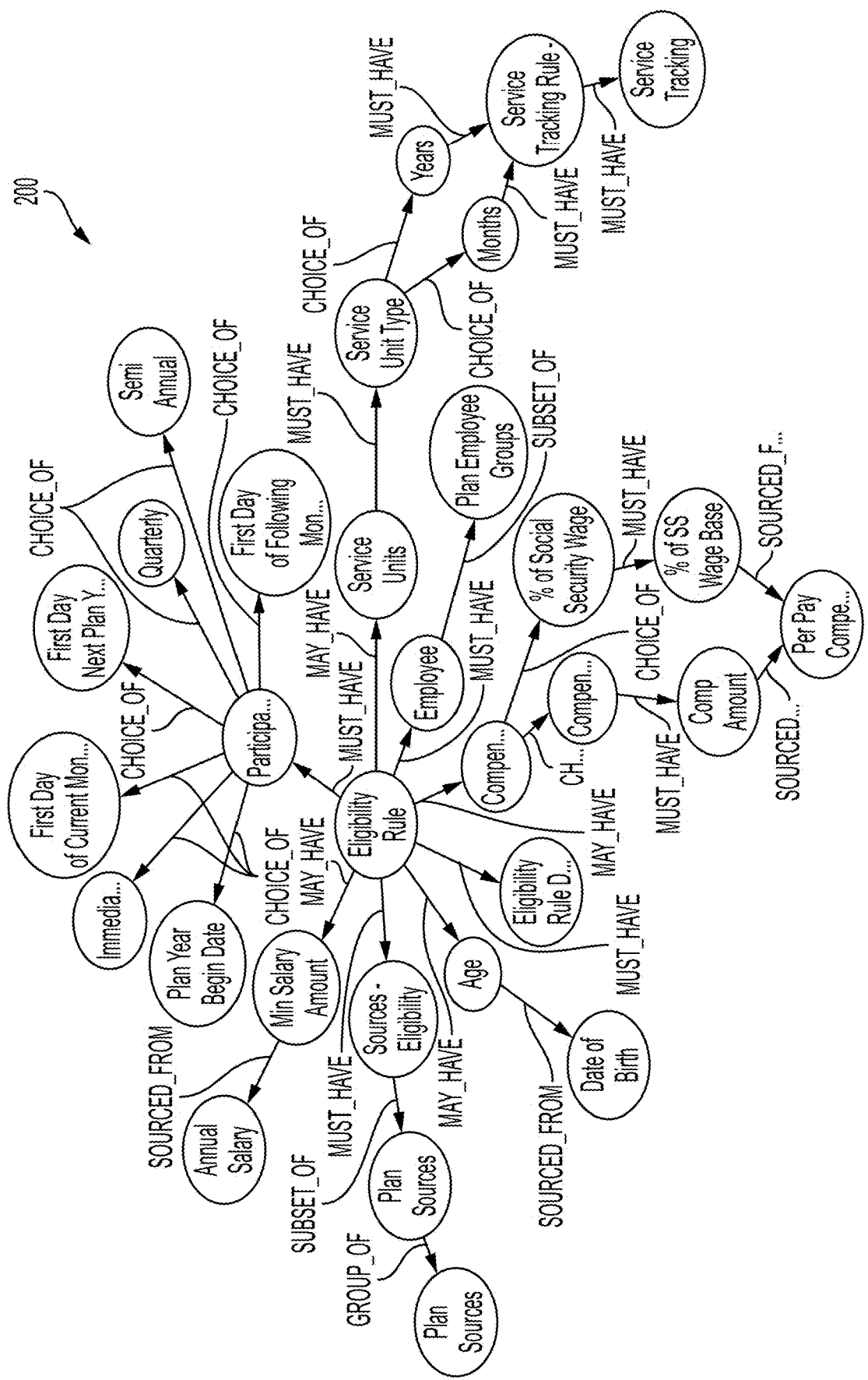
FIG. 2 schematically illustrates an example fragment of an offering mesh, in accordance with one or more aspects of the present disclosure.

FIG. 2 schematically illustrates an example fragment of an offering mesh representing a multitude of possible permutations of financial product definition provisions, in accordance with one or more aspects of the present disclosure. As shown in FIG. 2, the offering mesh fragment 200 may be implemented by a graph model, the nodes of which represent various data points related to one or more services employed by a financial product, while the edges represent relationships among the data points.

Each node of the offering mesh may have one or more attributes. The name attribute may be represented by an arbitrary alphanumeric string. Other attributes, depending on the node type, may be represented by numbers or alphanumeric strings. Each edge of the offering mesh may be characterized by a relationship type, which may be represented by a transitive verb, such that one node of the pair of nodes associated by the edge represents a subject, the relationship type represents a predicate associated with the subject, and the other node of the pair of nodes represents an object associated with the predicate.

In various illustrative examples, the offering mesh may include one or more nodes of each of the following types: customer demographics, service, offer, feature, group, data type, and/or data field. These node types are utilized in various example implementations described herein. In various other implementations, additional types of mesh offering nodes may be utilized.

A customer demographics node represents a category of customer-level information that may be utilized for specifying the organization, plan, and/or other customer-related data.

A service node corresponds to a logical grouping of services, such as eligibility, vesting, etc. Each service node is associated with at least one offer node, which represents a variation of the service chosen by the client. Examples of offer nodes include provider calculated eligibility, plan sponsor basic vesting, etc.

A feature node represents a group of features that are typically shared by two or more services. Examples of feature nodes include service tracking, employee groups, plan sources, etc.

A group node represents a decision point, at which a selection of one or more options or features from a group of available options or features should be made.

A data type node represents a data point associated with another node, e.g., a predetermined option of a group of options or a required user-entry field of a predetermined type (e.g., a numeric value, a text string, or a Boolean value).

A data field node represents the participant level data that is required to be provided by the client.

Figure 3A:
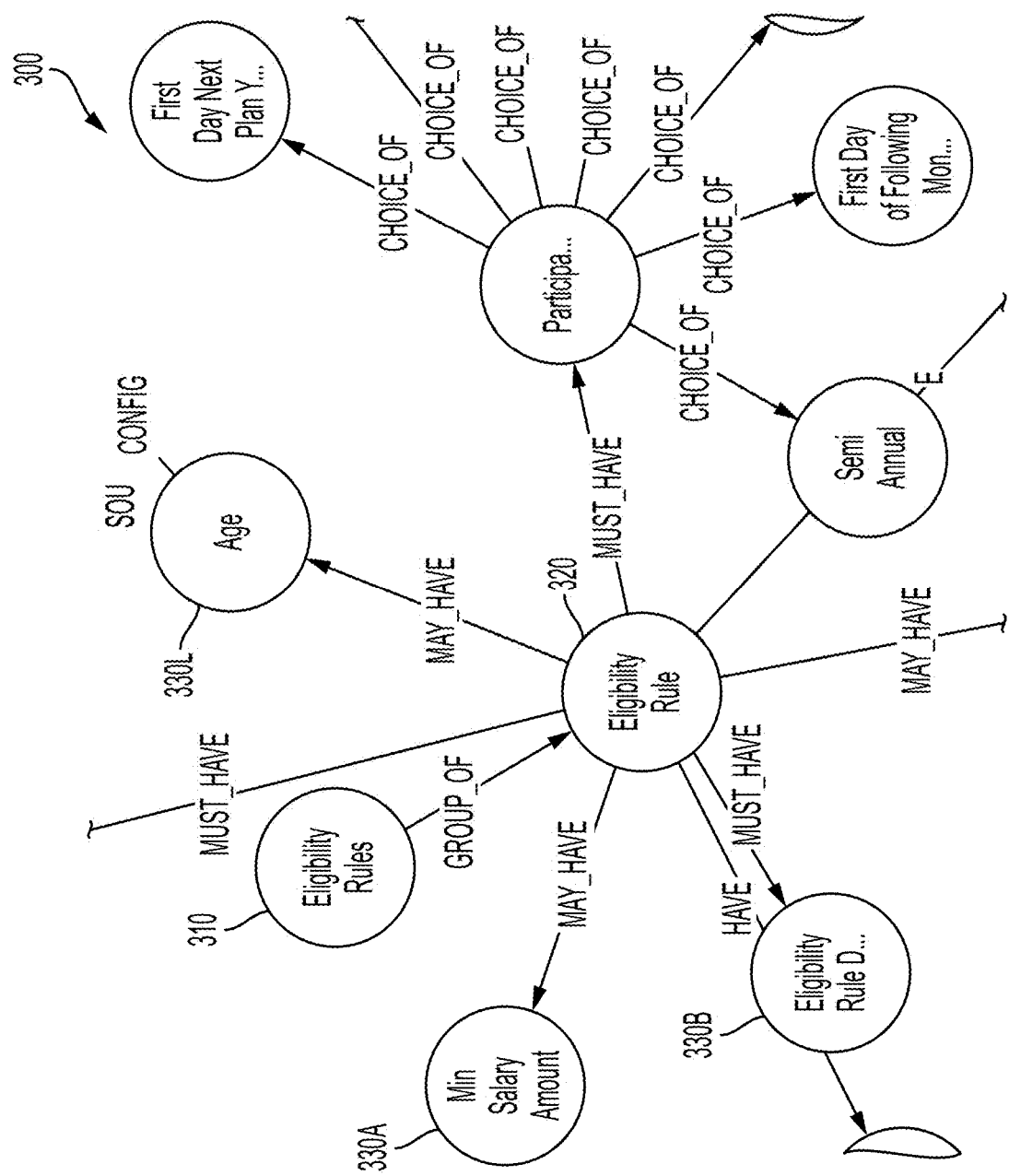
FIG. 3A schematically illustrates an example offering mesh fragment specifying an eligibility rule, in accordance with one or more aspects of the present disclosure.

FIG. 3A schematically illustrates an example offering mesh fragment specifying an eligibility rule, in accordance with one or more aspects of the present disclosure. As shown in FIG. 3A, the example offering mesh fragment 300 may include the Eligibility Rules array 310, which in turn may include the Eligibility Rule 320. The Eligibility Rule 320 may be associated with multiple objects 330A-330L by the relationships of specified types (e.g., MUST_HAVE or MAY_HAVE). FIG. 3B schematically illustrated the JSON representation 340 of the example offering mesh fragment of FIG. 3A. The JSON representation 340 may be stored in the offering mesh database 420 of FIG. 4, and may be retrieved and processed by the offer physics service 410 of FIG. 4, as described in more detail herein below.

Figure 4:
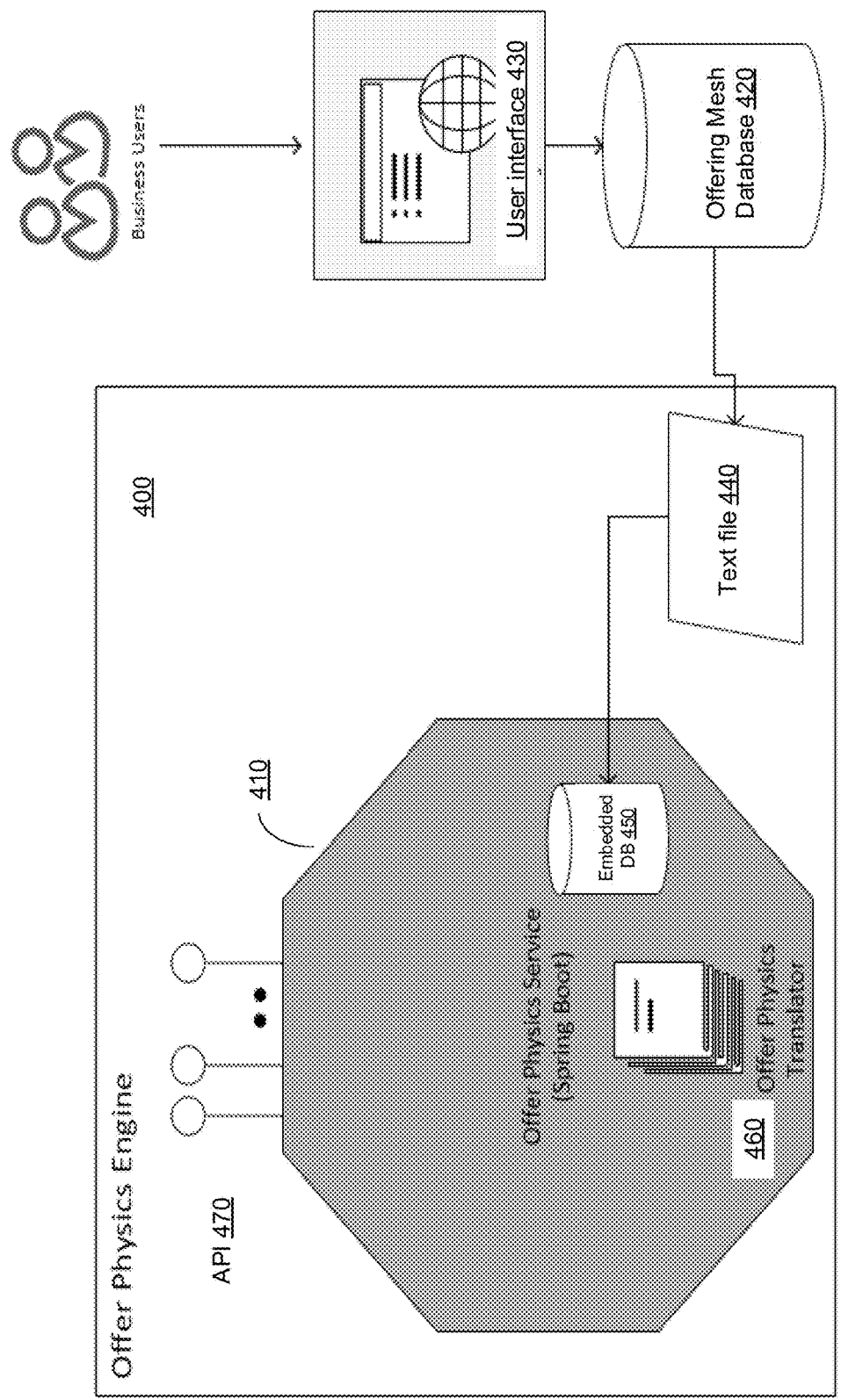
FIG. 4 schematically illustrates an example offer physics engine implemented in accordance with one or more aspects of the present disclosure.

FIG. 4 schematically illustrates an example offer physics engine implemented in accordance with one or more aspects of the present disclosure. As shown in FIG. 4, the functionality of the offer physics engine 400 may be implemented as the offer physics service 410, which may be provided by a Spring application or an application built for any other suitable platform.

The offer physics service 410 may extract the offering definitions from the offering mesh database 420, the contents of which represent a multitude of possible permutations of financial product definition provisions. The contents of the offering mesh database 420 may be created and/or updated by business users (e.g., financial product owners or solution architects) via the user interface 430. In some implementations, the offering mesh information retrieved from the offering mesh database 420 may be stored into a text file 440, which may then be imported by the offer physics service 410 and stored in the embedded database 450.

The offer physics service 410 may then employ the offer physics translator 460 to translate the extracted offering mesh into a set of business objects, which may be exported via the Representational State Transfer (REST)-compliant API 470. The business object definitions may be compliant with a predetermined structured object format. Each business object definition may specify the object type and one or more object attribute values.

In an illustrative example, the offer physics translator 460 may apply a set of predetermined or dynamically configurable translation rules to the extracted fragments of the offering mesh. In an illustrative example, a translation rule may specify a template to be applied to one or more fragments of the offering mesh and may further specify an object type and/or one or more object attribute values of the business object to be generated responsive to determining that the template specified by the rule matches the fragments of the offering mesh. In various other implementations, other translation methods and/or translation rule formats may be employed.

Figure 5:
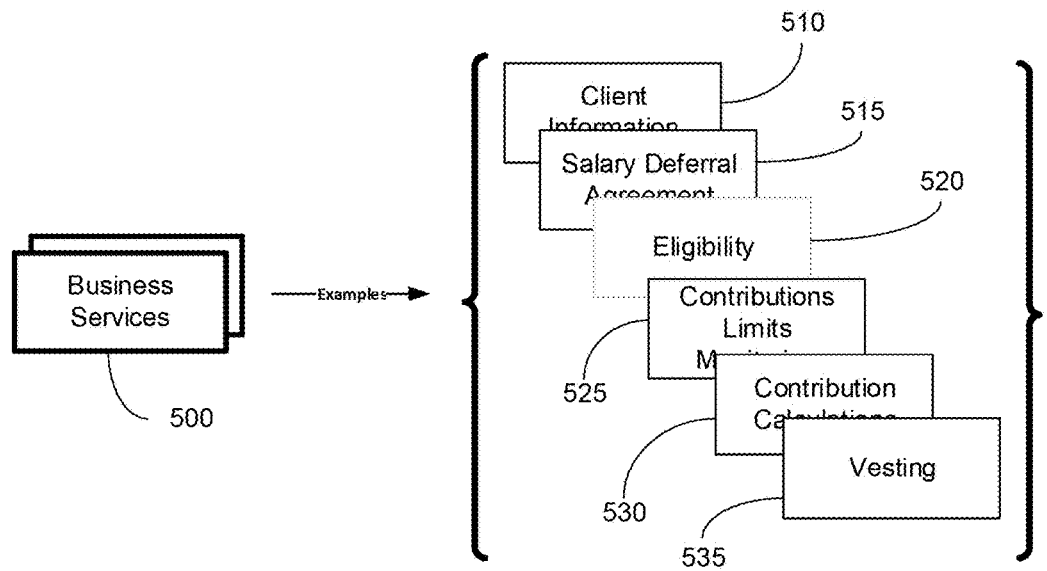
FIG. 5 schematically illustrates example business service implementations, in accordance with one or more aspects of the present disclosure.
Figure 5:
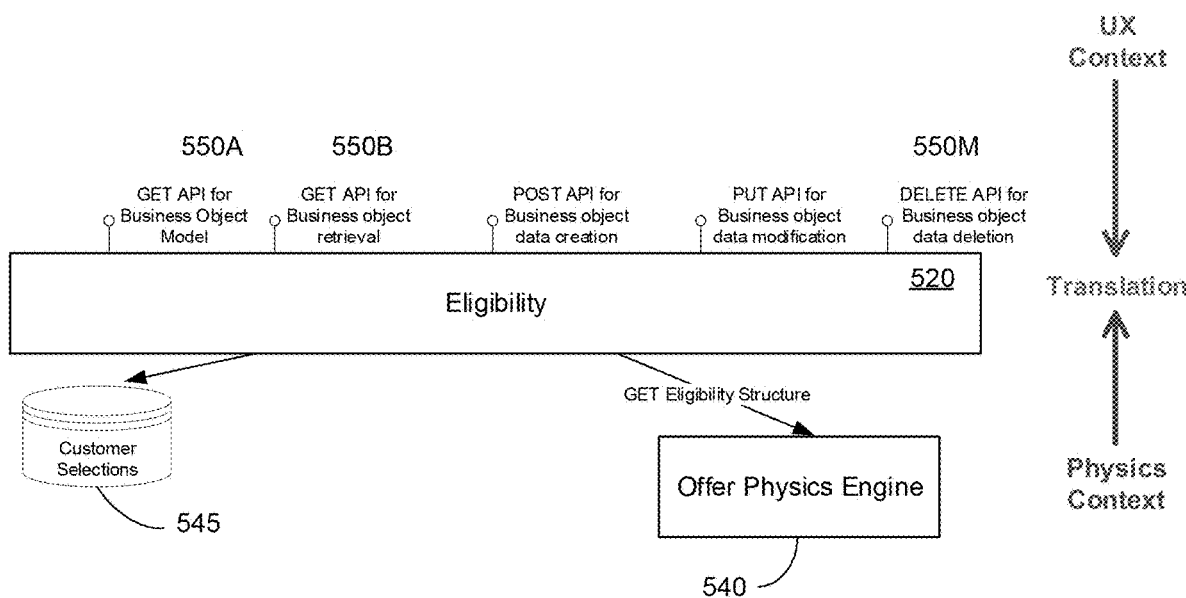

FIG. 5 schematically illustrates example business service implementations, in accordance with one or more aspects of the present disclosure. As shown in FIG. 5, the business services layer 500 implemented by a financial product offering may include the client information service 510, the salary deferral agreement service 515, the eligibility service 520, the contributions limits monitoring service 525, the contribution calculation service 530, and the vesting service 535. Each business service may construct respective business objects based on services definitions received from the offer physics engine 540 and customer selections of service configuration options, preferences, and parameters received via a user interface layer 545. Thus, the business services layer 500 may act as a translator between the service definitions retrieved from the offer physics engine 540 and the user interface layer, the output of which is stored in the customer selections database 545. Furthermore, the business services layer 500 may translate the imported service definitions and customer selections to definitions of SOA services, which may be exposed via the respective provisioner APIs for consumption by the provisioners, as described in more detail herein below.

In certain implementations, the business services layer 500 may apply a set of predetermined or dynamically configurable translation rules to the business object definitions. In an illustrative example, a translation rule may specify a template to be applied to a business object definition and may further specify a service type, one or more service parameter values, and/or fragments of executable code implementing the service to be generated responsive to determining that the template specified by the rule matches the business object definition. In various other implementations, other translation methods and/or translation rule formats may be employed.

In an illustrative example, the eligibility service 520 may import the eligibility service definition from the offer physics engine 540 and may further import the customer selections from the customer selections database 545. The eligibility service 520 may translate the imported service definitions and customer selections to definitions of SOA services, which may be exposed via the APIs 550A-550M.

Figure 6:
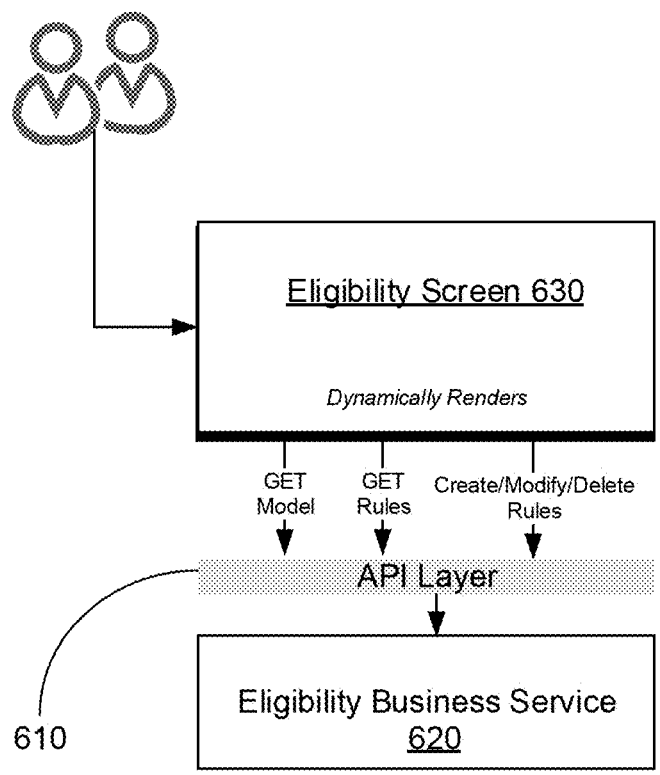
FIG. 6 schematically illustrates operation of the user interface layer, in accordance with one or more aspects of the present disclosure.
Figure 7:
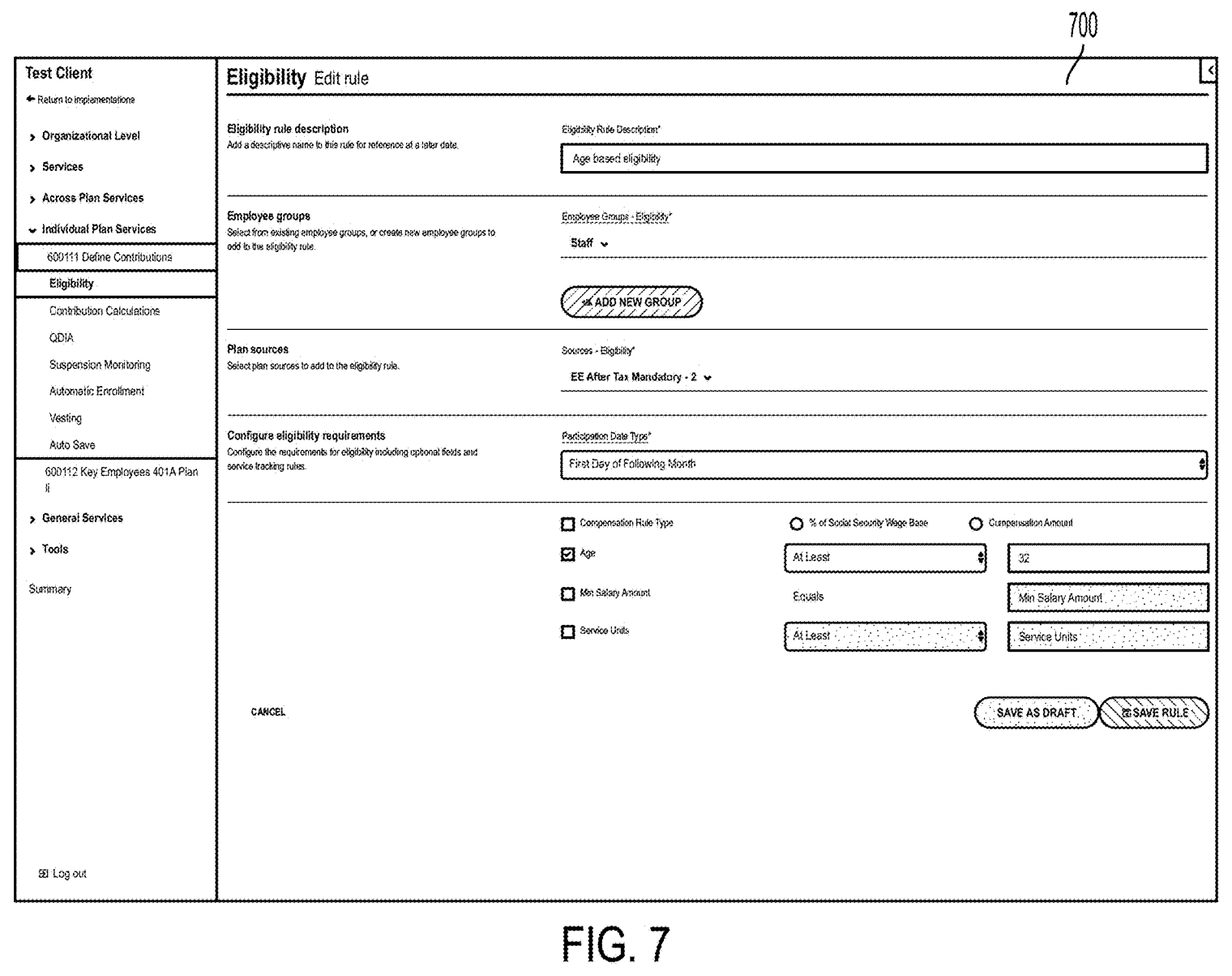

FIGS. 6-7 schematically illustrate the operation of the user interface layer, in accordance with one or more aspects of the present disclosure. The user interface layer facilitates gathering of the customer selections by generating questions and customer selection fields based on the available options of the current service configuration and the user selections that have already been made, thus limiting the data required to be supplied by the user to only include the relevant questions and selections. The user interface layer provides the save/restart session functionality and seamless navigation through multiple screens, thus improving the overall user experience in specifying the service configuration options, preferences, and parameters.

As shown in FIG. 6, the user interface layer may receive, via the API layer 610, service and object definitions that are exposed by the business services layer (e.g., the eligibility business service 620). The user interface layer may translate the received service and object definitions into human-readable representations, which may be rendered via a GUI (e.g., the eligibility screen 630). The user interface layer may then receive customer selections (e.g., service configuration options, preferences, and parameters) and store the service configuration options, preferences, and parameters in a customer selections database (not shown in FIG. 6). An example screen 700 rendered by the user interface layer is shown in FIG. 7.

In certain implementations, the user interface layer is programmed to validate the user input by applying input validation rules to the current service configuration and the user selections that have already been made. An input validation rule may specify one or more logical and/or arithmetic expressions to be computed on the service configuration parameters and other relevant data, and may compare the result of evaluating the logical and/or arithmetic expressions to a predetermined value or a predetermined range of values.

Figure 8:
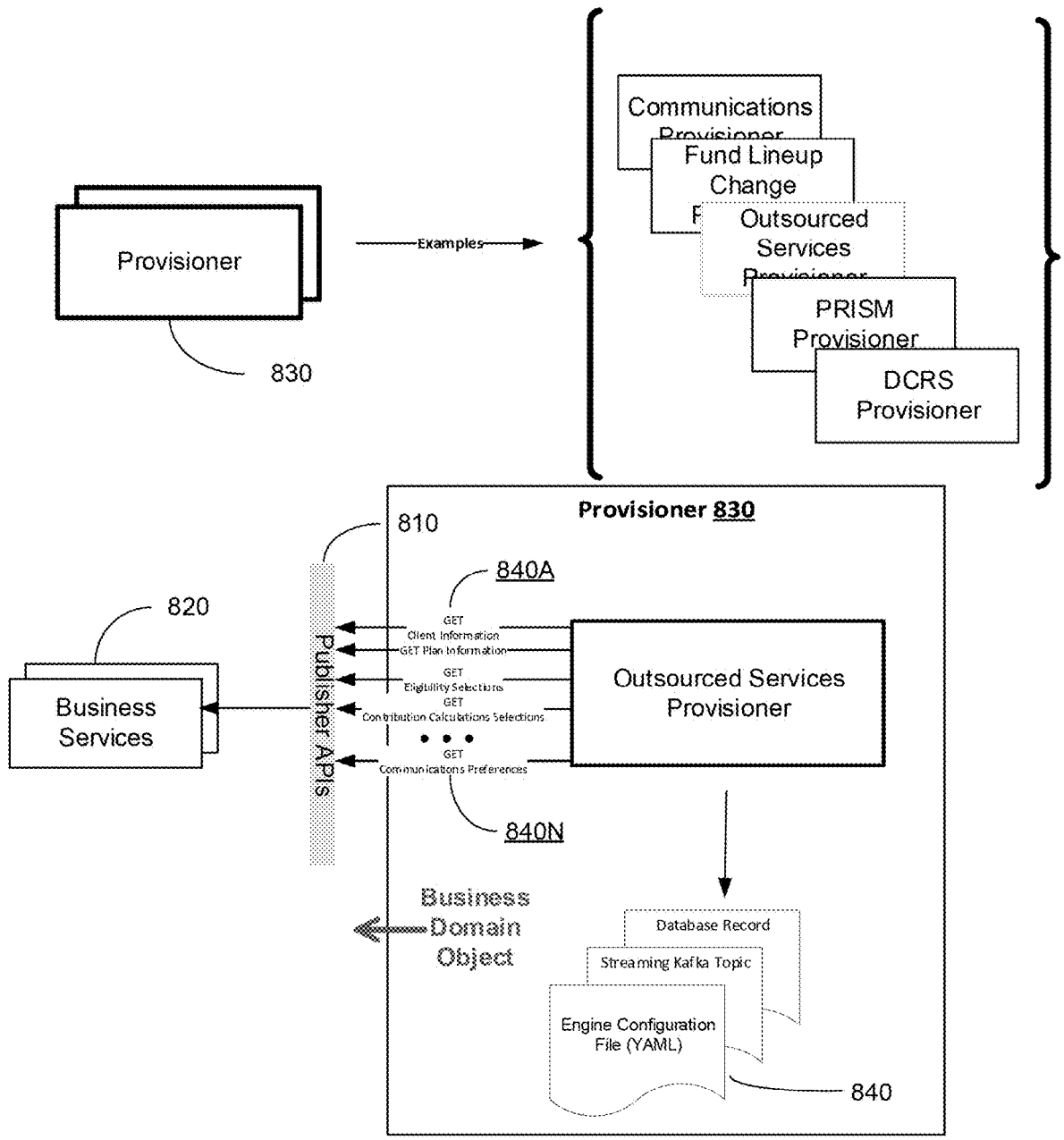
FIG. 8 schematically illustrates operations of example publisher application programming interface (API) and provisioners, in accordance with one or more aspects of the present disclosure.

FIG. 8 schematically illustrates operations of example publisher API and provisioners, in accordance with one or more aspects of the present disclosure. As shown in FIG. 8, the publisher API 810 provides an interface between the business services 820 and one or more provisioners 830. The publisher API 810 may expose multiple REST-compliant function calls 840A-840N (e.g., GET Client Information, GET Plan Information, GET Eligibility Services, etc.). Provisioners 830 retrieve the business context information via the publisher API and transform the retrieved information to system configurations 840.

In certain implementations, a provisioner 830 may apply a set of predetermined transformation rules to the business context information received via the publisher API. In an illustrative example, a transformation rule may specify a template to be applied to the business context information and may further specify one or more system configuration parameters to be generated responsive to determining that the template specified by the rule matches the business context information. In various other implementations, other transformation methods and/or transformation rule formats may be employed.

In various illustrative examples, the provisioners 830 may include a communications provisioner, an outsourced services provisioner, and/or other provisioners, each of which generates a system configuration for a respective provisioning agent. Configurations generated by the provisioners 830 may be stored in the form of one or more data files (such as YAML ("YAML Ain't Markup Language") files), data streaming service topics, and/or database records.

Figure 9:
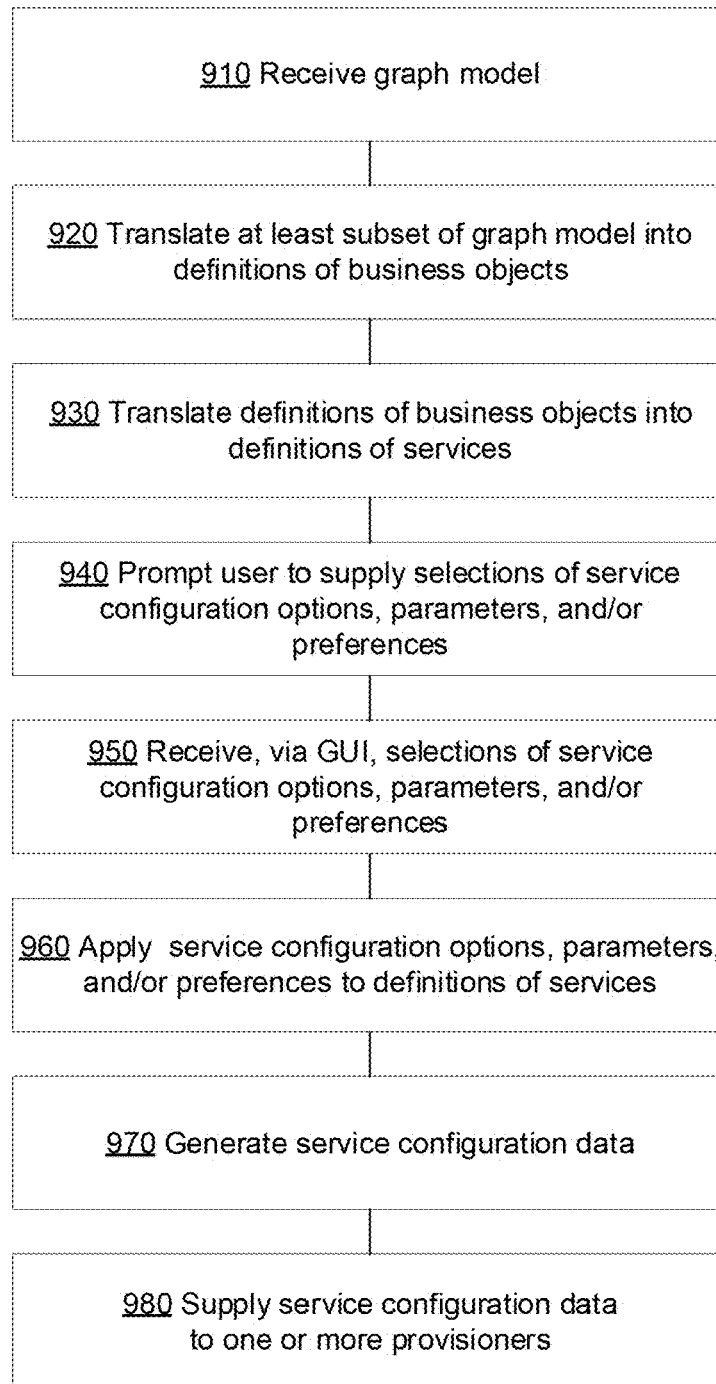
FIG. 9 depicts a flow diagram of an example method of model-based configuration of a financial product offering, in accordance with one or more aspects of the present disclosure.

FIG. 9 depicts a flow diagram of an example method 900 of model-based configuration of a financial product offering, in accordance with one or more aspects of the present disclosure. Method 900 and/or each of its individual functions, routines, subroutines, or operations may be performed by one or more general purpose and/or specialized processing devices. Two or more functions, routines, subroutines, or operations of method 900 may be performed in parallel or in an order that may differ from the order described above. In certain implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other. In an illustrative example, a computer system implementing method 900 may include one or more example computer systems 1000 of FIG. 10.

At block 910, the computer system implementing the method may receive a graph model representing a plurality of permutations of definition provisions of a financial product. The nodes of the graph model may represent various data points related to one or more services employed by a financial product, while the edges may represent relationships among the data points. In various illustrative examples, the financial product may be represented by a retirement account, an annuity contract, an individual retirement account, or a target date fund, as described in more detail herein above.

At block 920, the computer system may translate at least a subset of the graph model into definitions of a plurality of business objects, which may be exported via a REST-compliant API. The business object definitions may be compliant with a predetermined structured object format. Each business object definition may specify the object type and one or more object attribute values. Translating the graph model into definitions of the business objects may be performed by applying a set of predetermined or dynamically configurable translation rules to the extracted fragments of the offering mesh, as described in more detail herein above.

At block 930, the computer system may translate the definitions of the plurality of business objects into definitions of a plurality of services, which may be exposed via the respective provisioner APIs for consumption by one or more provisioners. Translating the definitions of the business objects into definitions of the services may involve identifying a plurality of service configuration options, parameters, and/or preferences to be received via a user interface. Translating the definitions of the business objects into definitions of the services may be performed by applying a set of predetermined or dynamically configurable translation rules to the business object definitions, as described in more detail herein above.

At block 940, the computer system may render, via the user interface, human-perceivable representations of the definitions of the plurality of services and prompt a user to supply selections of the identified service configuration options, parameters, and/or preferences, as described in more detail herein above.

At block 950, the computer system may receive, via the user interface, the user's selections of the identified service configuration options, parameters, and/or preferences. The computer system may apply a set of input validation rules to the plurality of service configuration options, parameters, and/or preferences, as described in more detail herein above.

At block 960, the computer system may apply the plurality of service configuration options, parameters, and/or preferences to the definitions of the plurality of services. This operation would further validate the service configuration options, parameters, and/or preferences based on the service definitions: should any of the user-supplied service configuration options, parameters, and/or preferences be found incompatible with the service definitions, a notification to the user and a prompt to re-enter the conflicting configuration options, parameters, and/or preferences may be displayed.

At block 970, the computer system may generate, based on the definitions of the plurality of services, service configuration data for the offering of the financial product.

At block 980, the computer system may supply the service configuration data to one or more provisioning agents, and the method may terminate.

Figure 10:
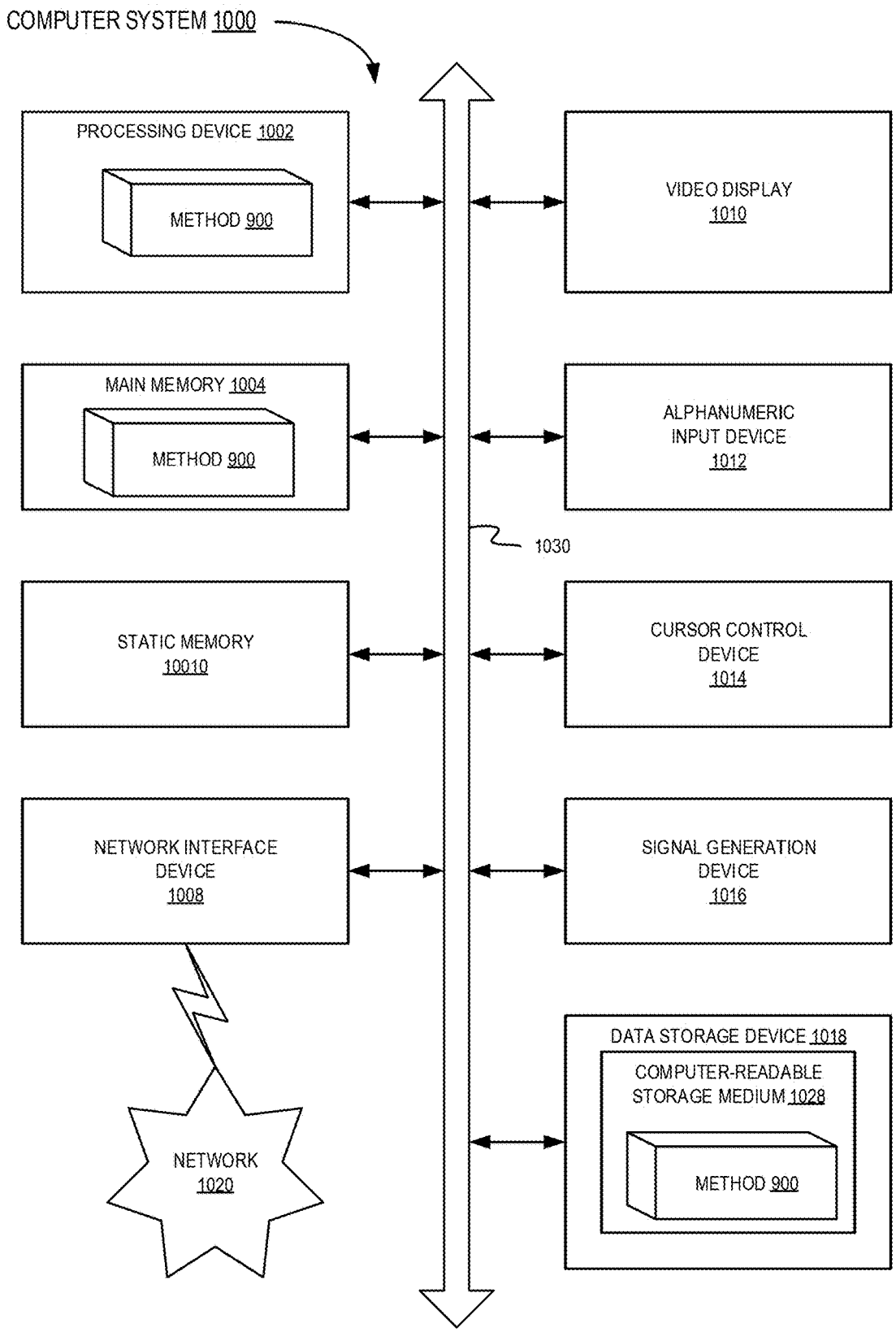
FIG. 10 illustrates a diagrammatic representation of a computer system that may be employed for implementing the methods described herein.

FIG. 10 illustrates a diagrammatic representation of a computer system 1000, which may be employed for implementing the methods described herein. The computer system 1000 may be connected to other computing devices in a LAN, an intranet, an extranet, and/or the Internet. The computer system 1000 may operate in the capacity of a server machine in a client-server network environment. The computer system 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 1000 may represent one or more servers of the distributed computer system 500 implementing the above-described method 900 of model-based configuration of a financial product offering.

The example computer system 1000 may include a processing device 1002, a main memory 1004 (e.g., synchronous dynamic random access memory (DRAM), read-only memory (ROM)), and a static memory 10010 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the method 900 of model-based configuration of a financial product offering, in accordance with one or more aspects of the present disclosure.

The computer system 1000 may further include a network interface device 1008, which may communicate with a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and/or an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028, on which may be stored one or more sets of instructions (e.g., instructions of the method 900 of model-based configuration of a financial product offering, in accordance with one or more aspects of the present disclosure) implementing any one or more of the methods or functions described herein. The instructions may also reside, completely or at least partially, within main memory 1004 and/or within processing device 1002 during execution thereof by computer system 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Unless specifically stated otherwise, terms such as "identifying," "determining," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices.

Examples described herein also relate to an apparatus for performing the methods and systems described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    receiving, by a computer system, a graph model representing a plurality of permutations of definition provisions of a financial product;
    translating, by the computer system applying a first set of translation rules, at least a subset of the graph model into definitions of a plurality of business objects, wherein each translation rule of the first set of translation rules specifies a first template to be applied to the subset of the graph model, an object type, and one or more object attribute values of a business object to be generated responsive to determining that the first template specified by the translation rule matches the subset of the graph model;
    translating, by the computer system applying a second set of translation rules, the definitions of the plurality of business objects into definitions of a plurality of Service-Oriented Architecture (SOA) services to be implemented by an offering of the financial product, wherein each translation rule of the second set of translation rules specifies a second template to be applied to a business object definition and executable code for implementing an SOA service of the plurality of SOA services, the executable code to be generated responsive to determining that the second template matches the business object definition;
    generating, by the computer system, based on the definitions of the plurality of SOA services, service configuration data for the offering of the financial product;
    supplying, via a publishing application programming interface (API), the service configuration data to one or more service provisioning agents;
    transforming, by the one or more service provisioning agents, the service configuration data into a system configuration;
    determining, by applying a set of rules to the system configuration, one or more system configuration parameters; and
    provisioning, by one or more provisioning agents, based on the one or more system configuration parameters, a computer and a software module for implementing the financial product offering comprising the plurality of SOA services.

2. The method of claim 1, further comprising:
    validating a plurality of service configuration options based on the definitions of the plurality of SOA services; and
    applying the plurality of service configuration options to the definitions of the plurality of SOA services.

3. The method of claim 1, wherein the financial product is represented by one of: a retirement account, an annuity contract, an individual retirement account, or a target date fund.

4. The method of claim 1, further comprising:
    receiving, via a user interface, a plurality of service configuration parameters;
    validating the plurality of service configuration parameters based on the definitions of the plurality of SOA services; and
    applying the plurality of service configuration parameters to the definitions of the plurality of SOA services.

5. The method of claim 1, further comprising:
receiving, via a user interface, a plurality of service configuration preferences;
and applying the plurality of service configuration preferences to the definitions of the plurality of SOA services.

6. The method of claim 1, wherein translating the definitions of the plurality of business objects into the definitions of the plurality of SOA services further comprises:
identifying a plurality of service configuration options.

7. The method of claim 1, further comprising:
rendering, via a user interface, representations of the definitions of the plurality of SOA services.

8. A system, comprising:
a memory; and
a processing device operatively coupled to the memory, wherein the processing device is configured to:
receive a graph model representing a plurality of permutations of definition provisions of a financial product;
translate, by applying a first set of translation rules, at least a subset of the graph model into definitions of a plurality of business objects, wherein each translation rule of the first set of translation rules specifies a first template to be applied to the subset of the graph model, an object type, and one or more object attribute values of a business object to be generated responsive to determining that the first template specified by the translation rule matches the subset of the graph model;
translate, by applying a second set of translation rules, the definitions of the plurality of business objects into definitions of a plurality of Service-Oriented Architecture (SOA) services to be implemented by an offering of the financial product, wherein each translation rule of the second set of translation rules specifies a second template to be applied to a business object definition and executable code for implementing an SOA service of the plurality of SOA services, the executable code to be generated responsive to determining that the second template matches the business object definition;
generate, based on the definitions of the plurality of SOA services, service configuration data for the offering of the financial product;
supply, via a publishing application programming interface (API), the service configuration data to one or more service provisioning agents;
transform, by the one or more service provisioning agents, the service configuration data into a system configuration;
determine, by applying a set of rules to the system configuration, one or more system configuration parameters; and
cause one or more provisioning agents to provision, based on the one or more system configuration parameters, a computer and a software module for implementing the financial product offering comprising the plurality of SOA services.

9. The system of claim 8, wherein the processing device is further configured to: validate a plurality of service configuration options based on the definitions of the plurality of SOA services; and
applying the plurality of service configuration options to the definitions of the plurality of SOA services.

10. The system of claim 8, wherein the financial product is represented by one of: a retirement account, an annuity contract, an individual retirement account, or a target date fund.

11. The system of claim 8, wherein the processing device is further configured to: receive, via a user interface, a plurality of service configuration parameters; validating the plurality of service configuration parameters based on the definitions of the plurality of SOA services; and
apply the plurality of service configuration parameters to the definitions of the plurality of SOA services.

12. The system of claim 8, wherein the processing device is further configured to: receive, via a user interface, a plurality of service configuration preferences; and apply the plurality of service configuration preferences to the definitions of the
plurality of SOA services.

13. The system of claim 8, wherein translating the definitions of the plurality of business objects into the definitions of the plurality of SOA services further comprises:
identifying a plurality of service configuration options.

14. The system of claim 8, wherein the processing device is further configured to: render, via a user interface, representations of the definitions of the plurality of SOA services.

15. A non-transitory computer-readable storage medium comprising executable instructions which, when executed by a computer system, cause the computer system to:
receive a graph model representing a plurality of permutations of definition provisions of a financial product;
translate, by applying a first set of translation rules, at least a subset of the graph model into definitions of a plurality of business objects, wherein each translation rule of the first set of translation rules specifies a first template to be applied to the subset of the graph model, an object type, and one or more object attribute values of a business object to be generated responsive to determining that the first template specified by the translation rule matches the subset of the graph model;
translate, by applying a second set of translation rules, the definitions of the plurality of business objects into definitions of a plurality of Service-Oriented Architecture (SOA) services to be implemented by an offering of the financial product, wherein each translation rule of the second set of translation rules specifies a second template to be applied to a business object definition and executable code for implementing an SOA service of the plurality of SOA services, the executable code to be generated responsive to determining that the second template matches the business object definition;
generate, based on the definitions of the plurality of SOA services, service configuration data for the offering of the financial product;
supply, via a publishing application programming interface (API), the service configuration data to one or more service provisioning agents;
transform, by the one or more service provisioning agents, the service configuration data into a system configuration;
determine, by applying a set of rules to the system configuration, one or more system configuration parameters; and
cause one or more provisioning agents to provision, based on the one or more system configuration parameters, a computer and a software module for implementing the financial product offering comprising the plurality of SOA services.

16. The non-transitory computer-readable storage medium of claim 15, further comprising executable instructions which, when executed by the computer system, cause the computer system to:

validate a plurality of service configuration options based on the definitions of the plurality of SOA services; and apply the plurality of service configuration options to the definitions of the plurality of SOA services.

17. The non-transitory computer-readable storage medium of claim 15, wherein the financial product is represented by one of: a retirement account, an annuity contract, an individual retirement account, or a target date fund.

18. The non-transitory computer-readable storage medium of claim 15, further comprising executable instructions which, when executed by the computer system, cause the computer system to:

receive, via a user interface, a plurality of service configuration parameters; validating the plurality of service configuration parameters based on the definitions of the plurality of SOA services; and apply the plurality of service configuration parameters to the definitions of the plurality of SOA services.

19. The non-transitory computer-readable storage medium of claim 15, further comprising executable instructions which, when executed by the computer system, cause the computer system to:

receive, via a user interface, a plurality of service configuration preferences; and apply the plurality of service configuration preferences to the definitions of the plurality of SOA services.

20. The non-transitory computer-readable storage medium of claim 15, further comprising executable instructions which, when executed by the computer system, cause the computer system to:

render, via a user interface, representations of the definitions of the plurality of SOA services.

* * * * *